(12) United States Patent
Bosch et al.

(10) Patent No.: US 11,447,705 B2
(45) Date of Patent: Sep. 20, 2022

(54) MEANS AND METHODS FOR MANAGING AMMONIA, AMINE AND NORMAL SALT FOULING IN OIL PRODUCTION AND REFINING

(71) Applicant: Halliburton Energy Services, Inc., Houston, TX (US)

(72) Inventors: Ronald Oliver Bosch, Houston, TX (US); Richard Wayne Saulnier, Needville, TX (US); Charles Richard Crow, Houston, TX (US); Russell Cody Strong, Jr., Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/311,081

(22) PCT Filed: Sep. 30, 2019

(86) PCT No.: PCT/US2019/053789
§ 371 (c)(1),
(2) Date: Jun. 4, 2021

(87) PCT Pub. No.: WO2021/066798
PCT Pub. Date: Apr. 8, 2021

(65) Prior Publication Data
US 2022/0041941 A1 Feb. 10, 2022

(51) Int. Cl.
C10G 29/22 (2006.01)
C09K 8/528 (2006.01)
C10G 75/02 (2006.01)
C10G 75/04 (2006.01)

(52) U.S. Cl.
CPC .............. *C10G 29/22* (2013.01); *C09K 8/528* (2013.01); *C10G 75/02* (2013.01); *C10G 75/04* (2013.01); *C10G 2300/202* (2013.01)

(58) Field of Classification Search
None
See application file for complete search history.

(56) References Cited

U.S. PATENT DOCUMENTS

| | | | | |
|---|---|---|---|---|
| 2,747,002 A | * | 5/1956 | Walker | E21B 43/34 585/815 |
| 3,232,970 A | * | 2/1966 | Hauptschein | C07C 69/63 562/605 |
| 3,637,017 A | * | 1/1972 | Gale | C09K 8/584 166/270.1 |
| 4,458,759 A | * | 7/1984 | Isaacs | E21B 43/24 166/272.3 |
| 7,279,089 B2 | | 10/2007 | Vercammen | |
| 8,381,811 B2 | | 2/2013 | Keatch et al. | |
| 9,868,910 B2 | | 1/2018 | LaChance et al. | |
| 2009/0114394 A1 | | 5/2009 | Javora et al. | |
| 2010/0206573 A1 | * | 8/2010 | Paulus | F25J 1/0296 166/302 |
| 2013/0137608 A1 | * | 5/2013 | Chang | C10L 3/101 507/90 |
| 2014/0262287 A1 | * | 9/2014 | Treybig | C09K 8/607 507/131 |
| 2017/0260441 A1 | | 9/2017 | Blumer et al. | |

FOREIGN PATENT DOCUMENTS

WO 2017/173266 A1 10/2017

OTHER PUBLICATIONS

International Search Report and Written Opinion issued in related PCT Application No. PCT/US2019/053789 dated Sep. 14, 2020 9 pages.

Gray, M. R., P. E. Eaton, and T. Le. "Kinetics of hydrolysis of chloride salts in model crude oil." Petroleum Science and Technology 26.16 (2008): 1924-1933.

* cited by examiner

*Primary Examiner* — John J Figueroa
(74) *Attorney, Agent, or Firm* — Conley Rose, P.C.; Rodney B. Carroll

(57) ABSTRACT

Methods for use in treating hydrocarbon streams are provided. The methods of the present disclosure include; introducing one or more alcohols into a hydrocarbon stream that includes one or more hydrolyzable chloride compounds; allowing the one or more alcohols to interact with, the one or more hydrolyzable chloride compounds; and increasing: one of a solubility value or a dispersancy value of at least a portion of the hydrolyzable chloride compounds in the hydrocarbon steam.

20 Claims, No Drawings

MEANS AND METHODS FOR MANAGING AMMONIA, AMINE AND NORMAL SALT FOULING IN OIL PRODUCTION AND REFINING

CROSS-REFERENCE TO RELATED APPLICATION

The present application is a U.S. National Stage Application of International Application No. PCT/US2019/053789 filed Sep. 30, 2019, which is incorporated herein by reference in its entirety for all purposes.

BACKGROUND

The present disclosure relates to compositions and methods useful in processes involving fluid flowing through, or contained in, conduits, such as pipes used, e.g., for the production and/or transport of petroleum products, natural gas, and the like.

Hydrocarbons, such as oil and gas, may be obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

After the hydrocarbons have been produced, they may be sent to one or more crude oil refineries for further processing. A refinery may include a tank farm or storage area where feed stocks, e.g., crude oil, shale oil, coal oil and certain intermediate hydrocarbon streams from the refining processes may be stored for utilization in the refinery. These feedstocks may contain chloride salts, primarily metal chloride salts and, more particularly, chlorides of alkali and alkaline earth metals. These chloride contaminants contained in hydrocarbon steams, at elevated temperatures and in the presence of water, may hydrolyze to form hydrochloric acid, which can cause corrosion and subsequent fouling problems to equipment and piping. For example, fouling with chloride salts may occur in refineries, oil production, and gas production and transport operations. In refineries, the chloride salts may include basic salts of ammonia and amines. These chloride salts may cause both fouling and corrosion. In some production environments, the chloride salt may be sodium chloride. In other production environments, the chloride salt may be calcium chloride or magnesium chloride.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless Be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure involving wellbores may be applicable to horizontal, vertical, deviated, or otherwise nonlinear wellbores in any type of subterranean formation. Embodiments may be applicable to injection wells, monitoring wells, and production wells, including hydrocarbon or geothermal wells.

The present disclosure relates to compositions and methods for use in treating hydrocarbon streams. Particularly, the present disclosure relates to compositions and methods for the use of alcohols and their oligomers and polymers to improve anti-fouling performance. In some embodiments, the present disclosure relates to the use of alcohols and their oligomers and polymers in combination with other salt control additives to improve anti-fouling performance. Without intending to be limited to any particular theory or mechanism, it is believed that in some embodiments the synergy of the alcohol moieties with the other salt control additives may be more effective at preventing, removing, and transporting chloride salts that may create fouling problems than any of the individual approaches alone.

The compositions and method of the present disclosure may be suitable in any hydrocarbon stream and any process wherein the hydrocarbon stream contains hydrolyzable chloride compounds, which, at elevated temperatures and in the presence of water can form hydrochloric acid. In some embodiments, the hydrocarbon streams may include crude oil, shale oil, coal oil, as well as various hydrocarbon streams that are produced in refinery operation and that are generally used as intermediates to produce other end products. In other embodiments, the hydrocarbon streams may include mixtures of one or more drilling fluids or treatment fluids with crude oil from at least a portion of a subterranean formation or wellbore. In certain embodiments, the chloride containing compounds can be any compound that may hydrolyze at elevated temperatures and in the presence of water to form hydrochloric acid. For example, in certain embodiments, the chloride containing compounds may be metal salts and, more particularly, salts of the alkali and alkaline earth metals, such as sodium chloride, calcium chloride, magnesium chloride, etc.

In certain embodiments, one or more alcohols may be used, inter alia, to increase the solubility of hydrolyzable chloride compounds in hydrocarbon streams. For example, in one or more embodiments, the one or more alcohols may increase the solubility value of hydrolyzable chloride compounds by about 300% or more. In one or more embodiments, the one or more alcohols may increase the solubility value of hydrolyzable chloride compounds by about 400% or more. In some embodiments, one or more alcohols may be used, inter alia, to increase the dispersancy of hydrolyzable chloride compounds in hydrocarbon streams. For example, in one or more embodiments, the one or more alcohols may increase the dispersancy value of hydrolyzable chloride compounds by 100% or more. In one or more embodiments, the one or more alcohols may increase the dispersancy value of hydrolyzable chloride compounds by 200% or more. In some embodiments, the one or more alcohols may increase the solubility value and/or dispersancy value as much, or more than, quaternary amine salts alone. In other embodiments, one or more alcohols may be used to increase both the solubility and dispersancy of hydrolyzable chloride compounds in hydrocarbon streams.

In certain embodiments, the alcohols used in the compositions and methods of the present disclosure may be or include any alcohol suitable for mixing with the hydrocarbon stream. In some embodiments, the alcohols may have a single hydroxyl group. For example, the alcohols used in the compositions and methods of the present disclosure may be or include simple and branched alcohols, their alkoxylates, and the mixtures of the same. In some embodiment the alcohols may be or include methanol, ethanol, propanol, butanol, pentanol, any oligomer thereof, or any polymer there. In other embodiments, the alcohols may have multiple hydroxyl groups. For example, in some embodiments, the alcohols may be or include ethylene glycol, propylene glycol, glycerol, erythritol, xylitol, sorbitol, volemitol, inositol, any oligomer thereof, or any polymer thereof. In some embodiments, the alcohols used in the compositions and methods of the present disclosure may be or include a single alcohol, any oligomer thereof, or any polymer thereof (e.g., diol, triol, polyol, etc.). In other embodiments, the alcohols used in the compositions and methods of the present disclosure may be or include a mixture of one or more alcohols, any oligomers thereof, or any polymers thereof.

In one or more embodiments, the one or more alcohols may interact with the hydrolyzable chloride compounds to decrease corrosion and fouling associated with the hydrolyzable chloride compound. In certain embodiments, one or more alcohols may be used to increase the solubility of hydrolyzable chloride compounds in hydrocarbon streams having any amount of hydrocarbons present in a base liquid. For example, in some embodiments, the hydrocarbons may be present in water. In other embodiments, the hydrocarbons may be present in one or more solvents. In one or more embodiments, the hydrocarbons may be present in the base liquid in an amount of from about 25% to about 99% by volume. In some embodiments, the hydrocarbons may be present in the base liquid in an amount of from about 50% to about 99% by volume. In other embodiments, the hydrocarbons may be present in the base liquid in an amount of from about 90% to about 99%. In some embodiments, hydrocarbon streams treated using the one or more alcohols of the present disclosure may contain hydrolyzable chloride compounds in any amount. For example, in one or more embodiments, the hydrolyzable chloride compounds may be present in an amount of from about 20 ppm to about 300,000 ppm. In certain embodiments, the hydrolyzable chloride compounds may be present in an amount equal to or greater than the solubility limit for that hydrolyzable chloride compounds in that hydrocarbon stream and/or base liquid.

In certain embodiments, the alcohols used in the compositions and methods of the present disclosure may be used with one or more other forms of salt control. In some embodiments, the addition of these alcohols with other forms of salt control may have a synergistic effect. In some embodiments the alcohols used in the compositions and methods of the present disclosure may be mixed with quaternized ammonia and amines with multiple and mixed counter ions. For example, in one or more embodiments, the counter ions may be chlorides, diethyl sulfates, sulfonates, succinates, or any combination thereof. In other embodiments, the alcohols used in the compositions and methods of the present disclosure may be mixed with choline salts and analogues thereof.

In one or more embodiments, these other forms of salt control may include surfactant programs such as various quaternary compounds. In some embodiments, these other forms of salt control may include surfactant/base shift methodologies such as the use of choline hydroxide. In certain embodiments, the compositions and methods of the present disclosure may include the use of ethylene glycol, propylene glycol, and mixtures thereof alone or in conjunction with other salt control strategies for chloride salt fouling and the associated corrosion of systems as a synergistic formulation. In some embodiments, the compositions and methods of the present disclosure may include the use of an alcohol functionality with choline hydroxide, inter alia, for control of ammonium salts and amine salts in refinery applications. In one or more embodiments, the compositions and methods of the present disclosure may include the use of alcohols in conjunction with quaternary ammonium salts, inter alia, for control of sodium chloride salts in oil production operations. In some embodiments, the compositions and methods of the present disclosure may include the use of either choline hydroxide or the combination of choline hydroxide and alcohols, inter alia, to control salt in oilfield production operations.

In some embodiments, the compositions and methods of the present disclosure may be used to treat a hydrocarbon stream containing, one or more hydrolyzable chloride compounds in a crude oil refinery. In one or more embodiments involving a crude oil refinery, the hydrocarbon stream (e.g., crude oil) may be pumped from a storage tank to a crude unit for processing. In a refinery the hydrocarbon stream (e.g., crude oil) may be first treated in one or more desalters. The desalter may remove a quantity of the chloride salts and other water-soluble contaminants prior to introducing, the hydrocarbon stream to downstream heat exchangers, furnaces, distillation columns, crackers and associated processing equipment such as pumps, valves, piping and other equipment commonly used in refineries and other petrochemical facilities. In one or more embodiments, the hydrocarbon stream fed to the desalter may be preheated to a temperature in a range of from about 200° F. (93.3° C.) to about 250° F. (121.1° C.). In some embodiments, after the hydrocarbon stream has passed through the desalter, it may pass through a second heating zone operated at a temperature in a range of from about 250° F. (121.1° C.) to about 600° F. (315.6° C.). In certain embodiments, the hydrocarbon stream then passes to a furnace where it may be heated to a temperature in a range of from about 600° F. (315.6° C.) to about 700° F. (371.1° C.). In some embodiments, the hydrocarbon stream may next be introduced into an atmospheric distillation column together with steam to make a rough fractionation into multiple cuts, e.g., four cuts: an overhead stream containing light hydrocarbon (e.g., $C_1$ to $C_8$ hydrocarbon); a first intermediate fraction including kerosene, jet fuel, or diesel fuel; a second intermediate traction containing gas, oil; and a bottoms fraction containing the heaviest components present in the hydrocarbon stream.

In certain embodiments, corrosion and fouling may occur in any area of a crude unit. In some embodiments, the most severe corrosion and fouling may occur in the overhead condensing system of the atmospheric distillation tower and equipment downstream of said tower (e.g., eokers, catalytic crackers, hydrotreaters, etc.). In one or more embodiments the hydrocarbon stream may be subject to a stream strip in the atmospheric distillation column. Thus, in one or more embodiments, hydrochloric acid formed upstream of the atmospheric distillation column may be carried over in the light fraction and may be condensed with water. In some embodiments, subsequent treatment of this condensed fraction may result in the hydrochloric acid coming in contact with and causing corrosive damage to process equipment used to treat the condensed fraction.

A person of skill in the art with the benefit of this disclosure will understand that the alcohols of the present disclosure may be inserted into the hydrocarbon stream in the crude oil refinery at any suitable point in the refinery process. In one or more embodiments, the one or more alcohols may be inserted into the hydrocarbon stream at a point before a significant amount of hydrolysis has occurred. In some embodiments, the one or more alcohols may be inserted into the hydrocarbon stream in the storage tank. In certain embodiments, the one or more alcohols of the present disclosure may be introduced into the hydrocarbon stream prior to the time the stream enters the second heating section, the heating section following the desalter and upstream of the furnace. In other embodiments, the one or more alcohols may be introduced downstream of the second heating section. In still other embodiments, the one or more alcohols may be introduced to the hydrocarbon stream prior to the first preheating section. In even other embodiments, the one or more alcohols may be introduced into the hydrocarbon stream in the heating section between the desalter and the furnace. In some embodiments, the one or more alcohols may be inserted using any chemical insertion methods. For example, in some embodiments, the one or more alcohols may be inserted using one or more pumps, nozzles, tubing, piping, and other associated equipment. In some embodiments, the one or more alcohols may be inserted using a distributed control system. In other embodiments, the one or more alcohols may be inserted using a manual control system.

In some embodiments, the compositions and methods of the present disclosure may be used to treat a hydrocarbon stream containing one or more hydrolyzable chloride compounds involved in one or more subterranean treatment operations. For example, in certain embodiments, the compositions and methods of the present disclosure may be used to treat at least a portion of a hydrocarbon streams within a well penetrating, at least a portion of a subterranean formation. In some embodiments, the well may be at a temperature greater than about 100° F. (37.8° C.). In other embodiments, the well may be at a temperature greater than about 200° F. (93.3° C.). In still other embodiments, the well may be at a temperature greater than about 250° F. (121.1° C.). In one or more embodiments, the hydrocarbon stream may be a crude oil stream contacted by one or more treatment fluids during a wellbore treatment operation. Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like. In some embodiments, the treatment fluids may be or include a drilling fluid.

In certain embodiments, one or more alcohols may be added to the treatment fluids prior to the treatment fluid being introduced into the wellbore. In other embodiments, one or more alcohols may be added to the treatment fluids after the treatment fluid has been introduced into the wellbore. In still other embodiments, one or more alcohols may be added to the treatment fluids after the treatment fluid has been removed from the wellbore. As discussed above, in one or more embodiments, one or more alcohols may be added to the treatment fluid along with one or more other salt control additives.

The treatment fluids used with the compositions and methods of the present disclosure may include any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and compositions of the present disclosure may include water from any source. Such aqueous fluids may include fresh water, salt water (e.g., water containing one or more salts dissolved therein), brine (e.g., saturated salt water), seawater, or any combination thereof. In many embodiments of the present disclosure, the aqueous fluids may include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or adjustments are appropriate. Examples of non-aqueous fluids that may be suitable for use in the methods and compositions of the present disclosure include, but are not limited to, oils, hydrocarbons, organic liquids, and the like. In certain embodiments, the fracturing fluids may include a mixture of one or more fluids and/or gases, including but not limited to emulsions, foams, and the like.

In certain embodiments, the treatment fluids used with the compositions and methods of the present disclosure optionally may include any number of additional additives. Examples of such additional additives include, but are not limited to, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, viscosifiers breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after viscosifying agent has been at least partially hydrated in the fluid. A person skilled in the art, with the benefit of this disclosure, will recognize the types of additives that may be included in the fluids of the present disclosure for a particular application.

The treatment fluids used with the compositions and methods of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the alcohols, salt control additives, and/or other components of the treatment fluid may be metered directly into a base treatment fluid to form a treatment fluid. In certain embodiments, the base fluid may be mixed with the alcohols, salt control additives, and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLE 1

In this example, deposit samples containing ammonia and amine chloride were collected from field locations containing hydrocarbon streams. The samples were preweighed and placed in containers. Next, 100 mL of traditional quaternary dispersants were added to one sample while 100 mL of a 50/50 mixture of traditional dispersants blended with one or more alcohols described in the present disclosure were added to a second sample. Agitation and heat were applied to the containers to mimic process conditions until no further dispersion of the deposit samples was observed. The samples were then filtered and the amount of deposit that was dispersed within the dispersants were calculated. The results of this test are shown in Table 1 below:

TABLE 1

| Deposit dissolution measurements | | |
|---|---|---|
| | | Amount of Deposit Dispersed |
| Ammonia and Amine Chloride containing deposit | Traditional Dispersant | 1 g |
| | Traditional Dispersant blended with Alcohol functionality | 5.76 g |

EXAMPLE 2

In this example, the settling time of various salts was measured in traditional dispersants both with and without the addition of one or more alcohols as described in the present disclosure. For example, the tests below were conducted on traditional quaternary dispersants, traditional quaternary dispersants blended with one or more alcohols, traditional choline dispersant, tradition choline dispersant blended with one or more alcohols, and traditional quaternary amines. A quantity of each of the dispersant mixtures was prepared for testing. Either ammonium chloride or sodium chloride was added until they became super saturated. Each of the dispersant mixtures were then added to a 23 inch long glass tube with an ID of 0.5 inches. Two additional grams of the ammonium or chloride salt was then added to the tube and mixed with the dispersants. The tube is then set in the upright position while the settling time is observed. The results are shown below in Table 2:

TABLE 2

| Salt settling times | | |
|---|---|---|
| | Settling time of Ammonium Chloride | Settling time of Sodium Chloride |
| Traditional Dispersant | 5 min | 12 seconds |
| Traditional Dispersant blended with Alcohol functionality | 5 min | 3 minutes |
| Traditional Choline Dispersant | 3 min | 1 minute 20 seconds |
| Traditional Choline Dispersant blended with Alcohol functionality | 6 min | 3 minutes |
| Traditional Quaternary Amine Dispersant | 7 minutes | 3 minutes |

Among the many potential advantages to the methods and compositions of the present disclosure, only some of which are alluded to herein, the methods, compositions, and systems of the present disclosure may provide improved salt control. The methods and compositions in one or more embodiments of the present disclosure may perform more cost effectively than certain existing products in both the refinery and production chemical markets.

An embodiment of the present disclosure is a method that includes: introducing one or more alcohols into a hydrocarbon stream that includes one or more hydrolyzable chloride compounds; allowing the one of more alcohols to interact with the one or more hydrolyzable chloride compounds; and increasing one of a solubility value or a dispersancy value of at least a portion of the hydrolyzable chloride compounds in the hydrocarbon steam.

In one or more embodiments described in the preceding paragraph, the one or more alcohols are selected from the group consisting of: methanol, ethanol, propanol, butanol, pentanol, ethylene glycol, propylene glycol, glycerol, erythritol, xylitol, sorbitol, inositol, any oligomer thereof, any polymer thereof, and any combination thereof. In one or more embodiments described above, the one or more alcohols include an ethylene glycol or one or more oligomers or polymers thereof. In one or more embodiments described above, the method further includes introducing one or more salt control additives into the hydrocarbon stream. In one or more embodiments described above, the one or more salt control additives is selected from the group consisting of: a choline salt, any analogue thereof, any polymer thereof, and any combination thereof. In one or more embodiments described above, the one or more salt control additives is selected from the group consisting of: a quaternized ammonia salt, a quaternized amine, any analogue thereof, any polymer thereof, and any combination thereof. In one or more embodiments described above, the hydrolyzable chloride compound includes a chloride salt. In one or more embodiments described above, the hydrocarbon stream has a temperature lower than about 200° F. In one or more embodiments described above, the solubility value is increased by about 400% or more. In one or more embodiments described above, the dispersancy value is increased by about 100% or more. In one or more embodiments described above, the hydrocarbon stream is located within a crude unit refinery. In one or more embodiments described above, the hydrocarbon stream is located within at least a portion of a wellbore penetrating at least a portion of a subterranean formation.

Another embodiment of the present disclosure is a method that includes: introducing one or more alcohols into a hydrocarbon stream within a crude unit refinery that includes one or more hydrolyzable chloride compounds; allowing the one or more alcohols to interact with the one or more hydrolyzable chloride compounds; and increasing one of a solubility value or a dispersancy value of at least a portion of the hydrolyzable chloride compounds in the hydrocarbon steam.

In one or more embodiments described in the preceding paragraph, the one or more alcohols are selected from the group consisting of: methanol, ethanol, propanol, butanol, pentanol, ethylene glycol, propylene glycol, glycerol, erythritol, sorbitol, volemitol, inositol, any oligomer thereof, any polymer thereof, and any combination thereof. In one or more embodiments described above, the method further includes introducing one or more salt control additives into the hydrocarbon stream. In one or more embodiments described above, the one or more alcohols are introduced into the hydrocarbon stream at a point where the hydrocarbon stream has a temperature lower than about 250° F. In one or more embodiments described above, the one or more alcohols are introduced into the hydrocarbon stream before the hydrocarbon stream is introduced into an overhead condensing system.

Another embodiment of the present disclosure is a method that includes: introducing a treatment fluid comprising one or more alcohols into a wellbore penetrating at least a portion of a subterranean formation; allowing the treatment fluid to contact a hydrocarbon stream that includes one or more hydrolyzable chloride compounds; and increasing one of a solubility value or a dispersancy value of at least a portion of the hydrolyzable chloride compounds in the hydrocarbon steam.

In one or more embodiments described in the preceding paragraph, the one or more alcohols are selected from the group consisting of: methanol, ethanol, propanol, butanol, pentanol, ethylene glycol, propylene glycol, glycerol, erythritol, xylitol, sorbitol, volemitol, inositol, any oligomer thereof, any polymer thereof, and any combination thereof. In one or more embodiments described above, the treatment fluid further includes one or more salt control additives.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope, and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   introducing one or more alcohols into a hydrocarbon stream that comprises one or more chloride salts of alkali or alkali earth metals;
   allowing the one or more alcohols to interact with the one or more chloride salts; and
   increasing one of a solubility value or a dispersancy value of at least a portion of the one or more chloride salts in the hydrocarbon steam.

2. The method of claim 1, wherein the one or more alcohols are selected from the group consisting of methanol, ethanol, propanol, butanol, pentanol, ethylene glycol, propylene glycol, glycerol, erythritol, xylitol, sorbitol, volemitol, inositol, any oligomer thereof; any polymer thereof, and any combination thereof.

3. The method of claim 1, wherein the one or more alcohols comprises an ethylene glycol or one or more oligomers or polymers thereof.

4. The method of claim 1 further comprising introducing one or more salt control additives into the hydrocarbon stream.

5. The method of claim 4, wherein the one or more salt control additives is selected from the group consisting of a choline salt, any analogue thereof, any polymer thereof, and any combination thereof.

6. The method of claim 4, wherein the one or more salt control additives is selected from the group consisting of: a quaternized ammonia salt, a quaternized amine, any analogue thereof, any polymer thereof, and any combination thereof.

7. The method of claim 1, wherein the hydrocarbon stream has a temperature lower than about 200° F.

8. The method of claim 1, wherein the solubility value is increased by about 400% or more.

9. The method of claim 1, wherein the dispersancy value is increased by about 100% or more.

10. The method of claim 1, wherein the hydrocarbon stream is located within a crude unit refinery.

11. The method of claim 1, wherein the hydrocarbon stream is located within at least a portion of a wellbore penetrating at least a portion of a subterranean formation.

12. The method of claim 1, wherein the hydrocarbon stream is within a crude unit refinery.

13. The method of claim 12 further comprising introducing one or more salt control additives into the hydrocarbon stream.

14. The method of claim 12, wherein the one or more alcohols are introduced into the hydrocarbon stream at a point where the hydrocarbon stream has a temperature lower than about 250° F.

15. The method of claim 12 wherein the one or more alcohols are introduced into the hydrocarbon stream before the hydrocarbon stream is introduced into an overhead condensing system.

16. A method comprising:
    introducing a treatment fluid comprising one or more alcohols into a wellbore penetrating at least a portion of a subterranean formation;

allowing the treatment fluid, to contact a hydrocarbon stream that comprises one or more chloride salts of alkali or alkali earth metals; and increasing one of a solubility value or a dispersancy value of at least a portion of the one or more chloride salts in the hydrocarbon steam.

17. The method of claim 16, wherein the one or more alcohols are selected from the group consisting of: methanol, ethanol, propanol, butanol, pentanol, ethylene glycol, propylene glycol, glycerol, erythritol, xylitol, sorbitol, volemitol, inositol, any oligomer thereof; any polymer thereof, and any combination thereof.

18. The method of claim 16, wherein the treatment fluid further comprises one or more salt control additives.

19. A method comprising:

introducing one or more alcohols and one or more salt control additives into a hydrocarbon stream that comprises one or more hydrolyzable chloride compounds, wherein the one or more salt control additives is selected from the group consisting of: a quaternized ammonia salt, a quaternized amine, any analogue thereof, any polymer thereof, and any combination thereof;

allowing the one or more alcohols to interact with the one or more hydrolyzable chloride compounds; and increasing one of a solubility value or a dispersancy value of at least a portion of the hydrolyzable chloride compounds in the hydrocarbon steam.

20. The method of claim 19, wherein the one or more alcohols comprises an ethylene glycol, any oligomer thereof, any polymer thereof, or any combination thereof.

\* \* \* \* \*